Jan. 22, 1957  H. D. TAYLOR  2,778,962
ARMATURE WINDING WITH FOUR PARALLELS PER PHASE
Filed Feb. 11, 1954  2 Sheets-Sheet 1
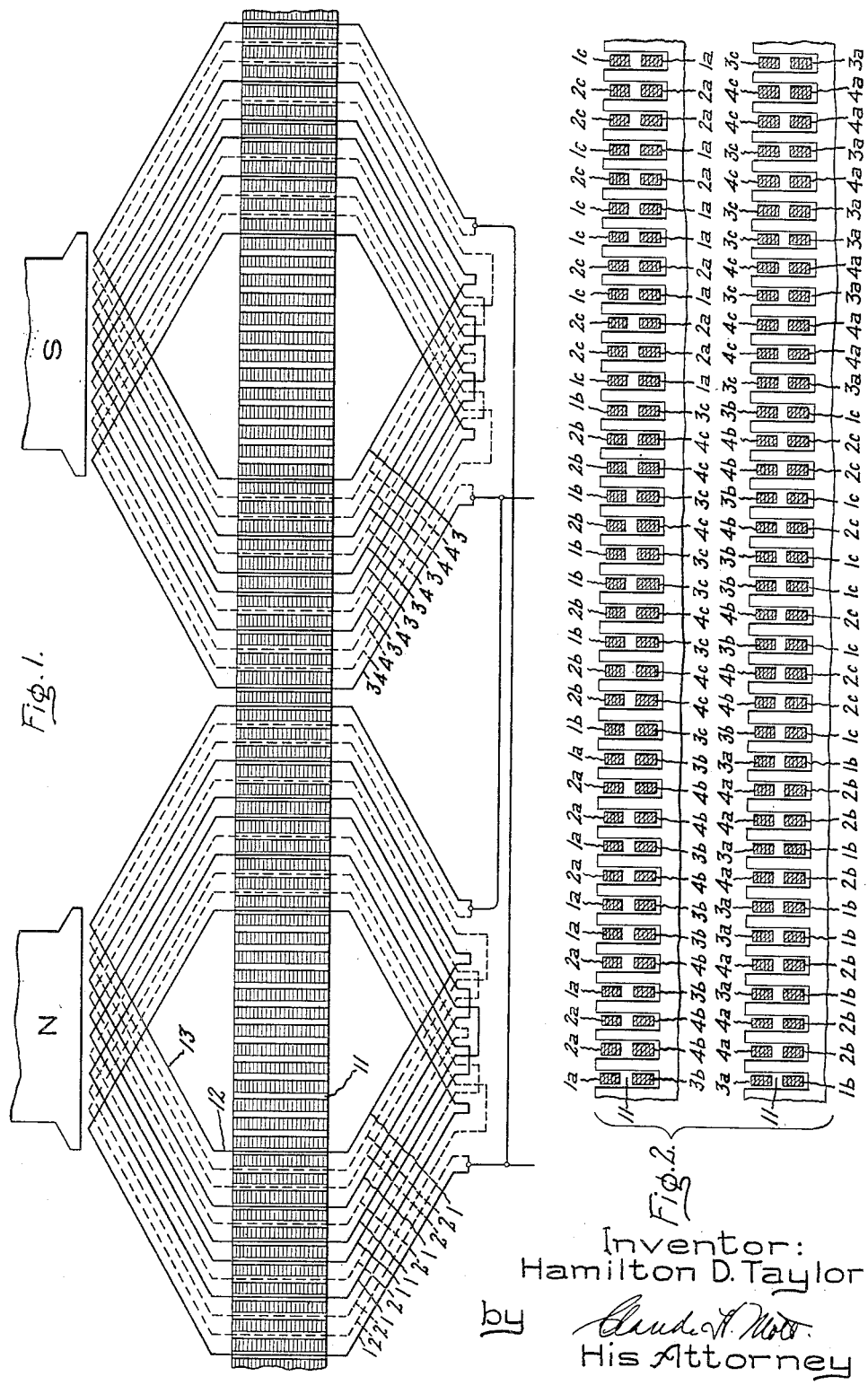
Inventor:
Hamilton D. Taylor
by  *Claude A. Mott*
His Attorney Jan. 22, 1957   H. D. TAYLOR   2,778,962
ARMATURE WINDING WITH FOUR PARALLELS PER PHASE
Filed Feb. 11, 1954   2 Sheets-Sheet 2

Inventor:
Hamilton D. Taylor
by
His Attorney

United States Patent Office 2,778,962
Patented Jan. 22, 1957

2,778,962

ARMATURE WINDING WITH FOUR PARALLELS PER PHASE

Hamilton D. Taylor, Schenectady, N. Y., assignor to General Electric Company, a corporation of New York Application February 11, 1954, Serial No. 409,619

8 Claims. (Cl. 310—202)

My invention relates to dynamoelectric machines and more particularly to turbine-driven generators having a relatively low voltage in relation to the kva. rating of the machine.

In the practical design of high capacity machines having parallel armature circuits, the number of parallel circuits in each phase has been limited to not more than the number of poles. In this way, each of the parallel circuits can be an exact electrical duplicate of the other parallel circuits with respect to the cutting of the field flux at any instant, so that their voltage output will be equal in magnitude and phase, with the result that there are no circulating currents in the parallel circuits. However, if a winding limited to one parallel circuit per pole is used, for example, in a 2-pole, 3-phase A. C. machine having approximately a 150,000 kva., 13,800 v. capacity, each of the two parallel circuits is required to conduct a current in excess of 3100 amperes. The design of externally ventilated coils to carry such high currents in turbine generators insulated for 13,800 v. is peculiarly difficult, as an unusually large cross-section of copper is required. This in turn requires slots of correspondingly large dimensions, with a relatively small area of contact between the coils and the slots providing for the transmission of heat from the coil to the core. This tends to make such coils have higher than permissible temperature rise. Moreover, if still more copper is added to reduce the high coil temperature, the slot becomes still larger. Furthermore, such large heavy coils are difficult to manufacture and awkward to handle; and the use of such large slots tends to cause a disproportionate increase in the iron losses in the generator, thus causing localized heating as well as some decrease in the generator efficiency. Consequently, it is distinctly advantageous in such a machine to employ additional parallel circuits, so as to reduce the coil and slot dimensions to more normal proportions, thus achieving lower coil temperatures, reduced losses, and improved efficiency.

Accordingly, it is an object of my invention to provide a dynamoelectric machine characterized by a winding having more than one parallel circuit per phase per pole.

It is another object of my invention to provide a high capacity relatively low voltage generator having two parallel circuits per phase per pole in which the circulating current losses caused by the unbalanced voltages in the parallel circuits are negligible.

Further objects and advantages of my invention will become apparent and my invention will be better understood by reference to the following description and the accompanying drawing, and the features of novelty which characterize my invention will be pointed out with particularity in the claims annexed to and forming a part of this specification.

Fig. 1 is a diagrammatic view of a development of the armature member of a dynamoelectric machine, with the wiring for one phase of a 3-phase, 2-pole, 72-slot generator with 2 parallel circuits per pole or 4 parallel circuits per phase.

Fig. 2 is a sectional view of the developed armature winding of the same machine.

Figure 3:
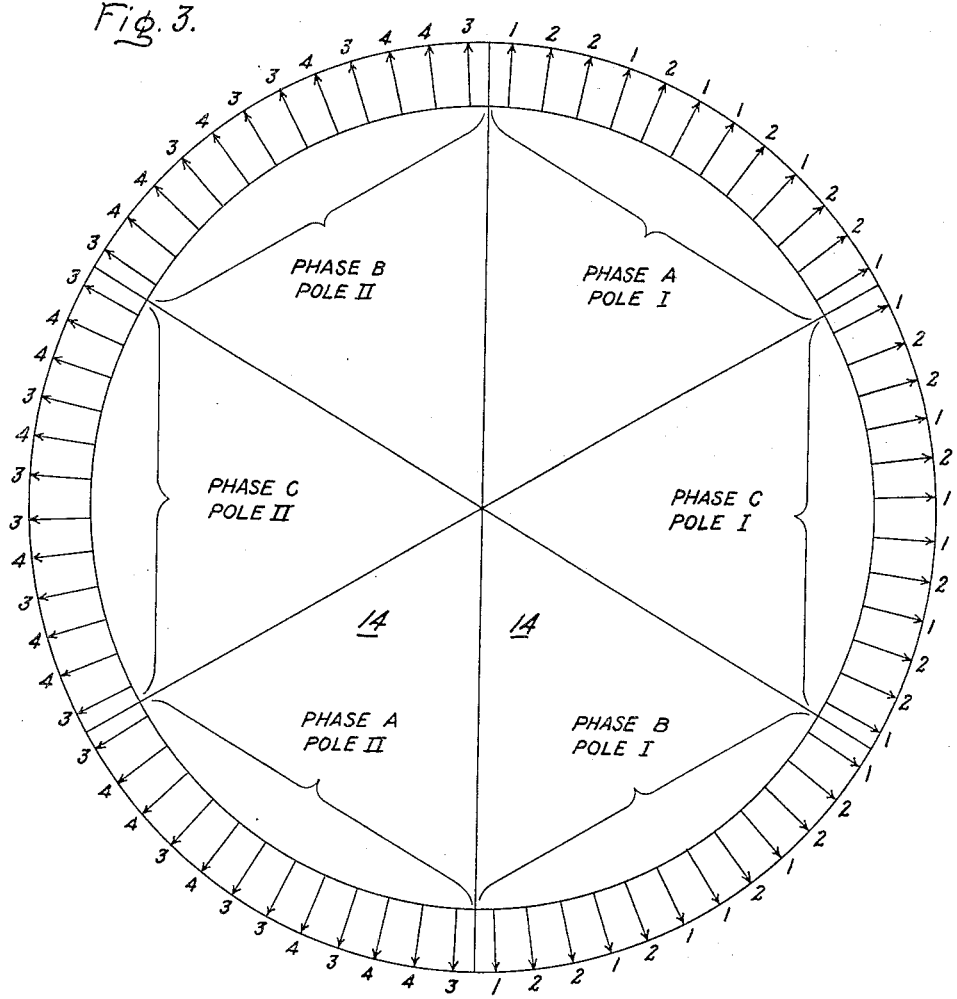
Fig. 3 is a schematic vectorial diagram of the voltage induced in each of the coils of the machine.

In accordance with the illustrated embodiment of my invention, I provide a 2-pole, 3-phase A. C. dynamoelectric machine having an armature provided with 72 winding slots in which 72 coils, each having 2 coil-sides, are disposed. The 36 slots under each pole are divided into 3 phase belts of 12 coils each, which are in turn selectively connected into 2 parallel circuits. The sequence of coils connected into these two circuits in each phase belt follows the order: 122121121221, where each number represents a coil, and indicates to which of the two circuits in a phase belt it is connected. It is apparent that the grouping of the coils is symmetrical about the center of the phase belt, for each of the parallel circuits, so that the induced voltages for the two circuits are precisely in phase. Also, the grouping is such that the total voltage generated in each circuit, i. e., the vector sum of the individual coil voltages, is very nearly the same in each circuit, the difference between them being extremely small, or less than ¼ of 1%. Circulating currents due to this small voltage difference are so small in a typical generator employing this winding arrangement that the $I^2R$ loss in the winding is increased by only about 2½% at full load which is a negligible amount.

In Fig. 1, I have shown my invention as applied to a 2-pole, 4-circuit A. C. generator having a field member diagrammatically indicated by north and south poles, N and S, and an armature member consisting of a core therein of magnetizable material having 72 coil slots 11 and a 2-layer winding consisting of conductors or coil sides 12 and end connectors 13. Only one of the 3 phases is shown in Fig. 1 for clarity of illustration. The placement of the coil sides in all 3 phases is shown in Fig. 2, in which the coil sides of the 2 circuits in each phase are indicated in the drawings by the numerals 1 and 2, respectively, for the first pole; and the coil sides of the 2 circuits in each phase for the second pole are indicated by the numerals 3 and 4, respectively. The subscripts $a$, $b$ and $c$ have been cited in Fig. 2 to indicate the three different phases of the machine. While the diagrams in Figs. 1 and 2 are shown as having a ⅔ pitch winding for clarity of illustration, my invention is equally applicable to other winding pitches.

As best shown in Fig. 3, the armature winding is formed of 6 pie-shaped segments or groups or phase belts 14. Each of the phase belts are 60 electrical degrees in width and each of the phase belts includes 12 coils. It will be noted that group or phase belt A of pole 1 contains coils in parallel circuits 1 and 2 only, whereas phase belt A of pole 2 contains coils connected in parallel circuits 3 and 4 only. Thus, there is provided 2 complete parallel circuits for each phase belt per pole. Phases B and C contain parallel circuits connected in a like sequential manner.

It will be noted in Fig. 2 that each of the coil sides 12, whether in circuit 1 or 2, is in effect a single conductor which may be either a single, solid conductor or it may be laminated into a plurality of strands which may be transposed in position in accordance with well-known methods, in order to reduce eddy currents and to bring about more effective utilization of the total cross sectional area available for each conductor.

It will be noted that it is important, in a winding pattern providing a plurality of parallel circuits per phase belt, to provide a pattern in which the resultant voltages induced across any one of the parallel circuits of a given phase will be in phase coincidence with each of the others. Therefore, according to my invention, the coils and coil sides are so arranged and positioned in each phase belt that the induced voltages are exactly in phase and are arranged in slots with respect to the center line of the group so as to produce the minimum difference in the magnitude of the voltage between the two circuits under any given pole.

In the 2-pole, 4-circuit, 72-slot machine herein illustrated, this is accomplished by means of a winding pattern wherein the coils are positioned in the slots in each of the phase belts in the sequence 122121121221 (or 344343343443). By the utilization of this winding sequence, the difference in magnitude of voltage between the two circuits in any phase is less than ¼ of 1%. This increases the heating of the armature coils by the circulating current between the parallel circuits only 2.6% over the heating which would be obtained with parallel circuits equal both in phase and in magnitude (i. e., those in which there is no circulating current loss). This small amount of additional heating of the armature coils is negligible. Thus, my invention permits the utilization of more than one circuit per phase per pole with this negligible increase in armature $I^2R$ loss and heating.

From the foregoing it will be apparent that the same winding pattern would be applicable to windings designed for different numbers of poles and winding slots, as for example, in a 4-pole machine having 144 slots with 8 parallel circuits per phase. Moreover, while it is preferable to connect only those coils in a single phase belt in series to form a given parallel circuit because of the relative simplicity of end turn connections, it is apparent that a coil or coil side in a given phase under one pole could be substituted in a parallel circuit for a coil or coil side of like sequential position in the same phase under the second pole.

While I have illustrated and described a particular embodiment of my invention, further modifications and improvements thereof will occur to those skilled in the art. I desire it to be understood, therefore, that my invention is not to be limited to the specific embodiment shown and I intend in the appended claims to cover all modifications thereof which do not depart from the spirit and scope of my invention.

What I claim as new and desire to secure by Letters Patent of the United States is:

1. A dynamoelectric machine comprising a polyphase winding and a multi-slot core therefor, said winding including a number of phase belts each provided with two parallel connected circuits, each circuit in each phase belt being provided with six series connected coils each having two coil sides, the twelve coil sides of each circuit respectively lying in twelve of the slots of said core, and the twelve adjacent coil sides of the two parallel connected circuits disposed in each phase belt being arranged in the sequence: 122121121221, where the numerals "1" indicate the six coil sides serially connected in one of the circuits in the phase belt and the numerals "2" indicate the six coil sides serially connected in the other of the circuits in the phase belt.

2. The dynamoelectric machine set forth in claim 1, wherein the induced voltages in the two parallel connected circuits disposed in each phase belt are substantially exactly in phase and have a difference in magnitude that is not substantially greater than about ¼ of 1%.

3. The dynamoelectric machine set forth in claim 1, wherein said winding is a three-phase winding including six phase belts, said core is provided with seventy-two slots, and said winding is arranged in two layers in said slots.

4. The dynamoelectric machine set forth in claim 1, wherein said coils are chorded.

5. A dynamoelectric machine comprising a polyphase winding and a multi-slot core therefor, each phase of said winding being provided with two oppositely poled phase belts connected with reversal in parallel relation, each of said phase belts being provided with two parallel connected circuits, whereby each phase of said winding is provided with four parallel connected circuits, each circuit in each phase belt being provided with six series connected coils each having two coil sides, the twelve coil sides of each circuit respectively lying in twelve of the slots of said core, and the twelve adjacent coil sides of the two parallel connected circuits disposed in each phase belt being arranged in the sequence: 122121121221, where the numerals "1" indicate the six coil sides serially connected in one of the circuits in the phase belt and the numerals "2" indicate the six coil sides serially connected in the other of the circuits in the phase belt.

6. A dynamoelectric machine comprising a polyphase winding and a multi-slot core therefor, said winding including a number of phase belts each provided with two parallel connected circuits, each circuit in each phase belt including six series connected conductors respectively disposed in six of the slots of said core, and the twelve adjacent conductors included in the two parallel connected circuits disposed in each phase belt being arranged in the sequence: 122121121221, wherein the numerals "1" indicate the six conductors serially connected in one of the circuits in the phase belt and the numerals "2" indicate the six conductors serially connected in the other of the circuits in the phase belt.

7. The dynamoelectric machine set forth in claim 6, wherein the central axis of each phase belt is disposed intermediate the twelve conductors therein, whereby the six adjacent positions of the six adjacent conductors on one side of the central axis respectively match the six adjacent positions of the six adjacent conductors on the other side of the central axis.

8. A dynamoelectric machine comprising a polyphase winding and a multi-slot core therefor, each phase of said winding being provided with two oppositely poled phase belts connected with reversal in parallel relation, each of said phase belts being provided with two parallel connected circuits, whereby each phase of said winding is provided with four parallel connected circuits, each circuit in each phase belt including six series connected conductors respectively disposed in six of the slots of said core, and the twelve adjacent conductors included in the two parallel connected circuits disposed in each phase belt being arranged in the sequence: 122121121221, wherein the numerals "1" indicate the six conductors serially connected in one of the circuits in the phase belt and the numerals "2" indicate the six conductors serially connected in the other of the circuits in the phase belt.

References Cited in the file of this patent

UNITED STATES PATENTS

| | | |
|---|---|---|
| 2,015,562 | Kilgore | Sept. 24, 1935 |

FOREIGN PATENTS

| | | |
|---|---|---|
| 518,135 | Great Britain | Feb. 19, 1940 |
| 151,049 | Switzerland | Feb. 16, 1932 |